Dec. 4, 1923.　　　　　　　　　　　　　　　　　　1,476,491
J. G. COLES
THREADLESS BOLT
Filed Oct. 7, 1922

Inventor
James G. Coles
By J. K. Bryant
Attorney

Patented Dec. 4, 1923.

1,476,491

UNITED STATES PATENT OFFICE.

JAMES G. COLES, OF HOPEWELL, PENNSYLVANIA, ASSIGNOR OF ONE-THIRD TO CHARLES H. RIGHTNOUR AND ONE-THIRD TO WILLIAM E. SCUTCHALL, BOTH OF HOPEWELL, PENNSYLVANIA.

THREADLESS BOLT.

Application filed October 7, 1922. Serial No. 593,033.

*To all whom it may concern:*

Be it known that I, JAMES G. COLES, a citizen of the United States of America, residing at Hopewell, in the county of Bedford and State of Pennsylvania, have invented certain new and useful Improvements in Threadless Bolts, of which the following is a specification.

This invention relates to certain new and useful improvements in threadless bolts and has particular reference to the idea of securely anchoring or fastening the nuts to the bolts to prevent accidental displacement thereof for holding objects firmly bound between the bolt head and nut.

The primary object of the invention resides in the provision of a threadless bolt wherein the bolt is provided with a plurality of adjacently positioned alternate annular grooves and ridges with a sectional nut having the inner faces of the section similarly grooved and ridged to be anchored on the bolt against an abutment or object by a collar or band that frictionally encloses the nut section.

With the above general objects in view and others that will appear as the nature of the invention is better understood, the same consists of the novel form, combination and arrangement of parts hereinafter more fully described, shown in the accompanying drawing and claimed.

Figure 1:
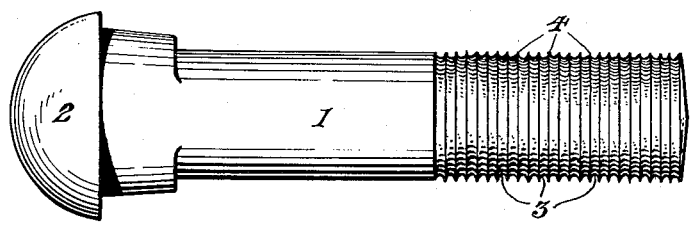
Figure 2:
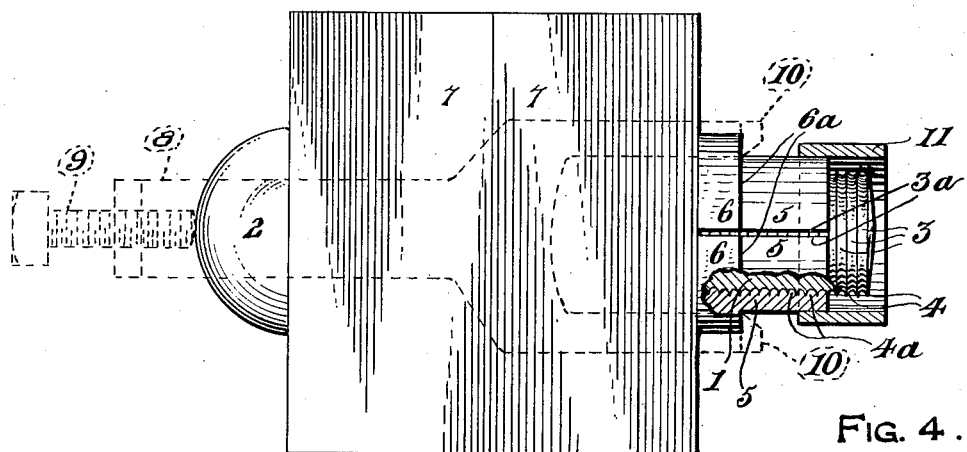
Figure 5:
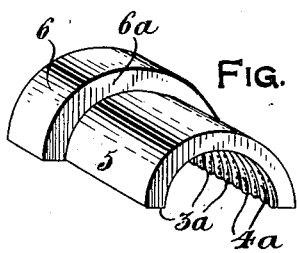
Figure 3:
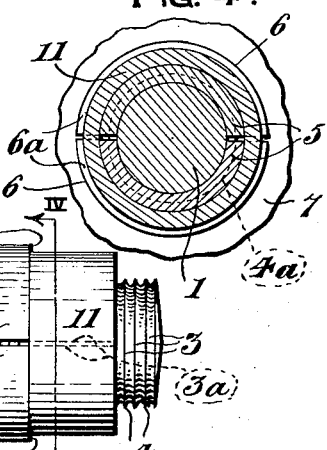
Figure 4:
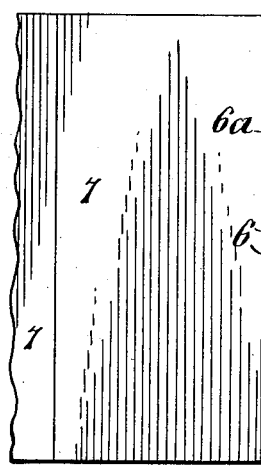
Figure 6:
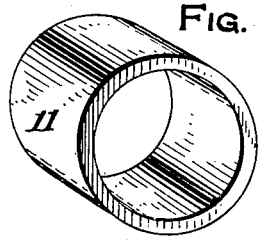

In the drawing, wherein like reference characters designate corresponding parts throughout the several views, Figure 1 is a side elevational view of the bolt employed with the nut showing the alternate annular grooves and ridges on the bolt shank, Figure 2 is a side elevational view, partly shown in section of the bolt and nut associated with two objects for clamping the same together, there being illustrated by dotted lines a clamp for moving the nut sections into engagement with the objects being clamped and the locking collar partially enclosing the sections of the nut, Figure 3 is a fragmentary side elevational view, similar to Fig. 2 showing the assembled bolt and nut lock, Figure 4 is a cross sectional view taken on line IV—IV of Fig. 3 showing the locking collar enclosing the sections of the nut and engaging the head flanges carried by the nut sections, Figure 5 is a perspective view of one of the nut sections, and Figure 6 is a perspective view of the locking collar.

Referring more in detail to the accompanying drawing, and particularly to Fig. 1, there is illustrated a bolt embodying a shank 1 having a head 2 at one end thereof, the opposite end of the shank 1 being provided over the desired length thereof with adjacently positioned annular grooves 3 defining intervening shoulders or ridges 4.

The nut associated with the bolt 1 is of the sectional type, and may be constructed of any number of sections desired, each section embodying an arcuate guide wall 5 carrying an arcuate head 6 upon one end thereof defining a shoulder 6ª as clearly shown in Figs. 2 and 5. The inner face of each nut section is provided with adjacently positioned arcuate ribs 3ª defining intervening recesses 4ª.

The shank 1 of the bolt being passed through openings in the members 7 that are to be clamped together, has the head 2 thereof engaging the outer face of one of the members 7 while the several nut sections 5 are placed upon the annularly grooved end of the bolt shank juxtaposed to the adjacent face of the member 7. The clamp 8 shown by dotted lines in Figs. 2, positioned exteriorly of one edge of the work 7, has the operating screw 9 thereof engaging the head 2 of the bolt while the opposite bifurcated end legs 10 engage the shoulders 6ª of the nut sections for forcing the latter into binding engagement with the member 7 and positioning the ribs 3ª in the desired grooves 3. When so positioned, as illustrated in Fig. 2, an annular collar 11 is positioned over the outer ends of the walls 5 of the nut sections, the collar 11 enclosing the nut sections for holding the same in position upon the bolt. The clamp 8 may then be removed and the locking collar 11 forced over the side walls 5 of the nut sections as shown in Fig. 3 for completely enclosing the same with the inner edge thereof engaging the shoulders 6ª of the nut sections, the locking collar 11 frictionally engaging the nut sections for holding the interengaging annular grooves and ribs in mating relation. The locking collar 11 frictionally engaging the side wall sections 5 of the nut, the latter is securely anchored upon the annularly grooved end of the bolt shank which will prevent longitudinal shifting movement of the nut upon the bolt and capable of withstanding shocks, jars or vibrations incident to the use thereof.

While there is herein shown and described the preferred embodiment of the present invention it is nevertheless to be understood that minor changes may be made therein without departing from the spirit and scope of the invention as claimed.

What is claimed as new is:—

1. In a device of the class described, a bolt having a shank annularly grooved at one end thereof defining spaced annular shoulders, a sectional nut having annular ribs on the inner face thereof to be received in the grooves of the bolt shank, and being of constant diameter throughout its length and a locking collar frictionally enclosing the nut sections.

2. In a device of the class described, a bolt having a shank annularly grooved at one end thereof defining spaced annular shoulders, a sectional nut having annular ribs on the inner face thereof to be received in the grooves of the bolt shank, and a locking collar enclosing the sectional nut, each nut section having a head at one end thereof defining a shoulder that is adapted to be engaged by a clamping device for initially holding the same in position with the shoulders of the several nut sections engaging by the adjacent edge of the locking collar.

In testimony whereof I affix my signature.

JAMES G. COLES.